United States Patent [19]
Mundy

[11] 3,755,692

[45] Aug. 28, 1973

[54] EXCLUSIVE-OR LOGIC CIRCUIT

[75] Inventor: Joseph L. Mundy, Schenectady, N.Y.

[73] Assignee: General Electric Company, Schenectady, N.Y.

[22] Filed: May 30, 1972

[21] Appl. No.: 257,540

[52] U.S. Cl. .................................. 307/216, 307/205
[51] Int. Cl. .............................................. H03k 19/32
[58] Field of Search .............................. 307/205, 216

[56] References Cited

UNITED STATES PATENTS

| | | | |
|---|---|---|---|
| 3,500,062 | 3/1970 | Annis | 307/216 |
| 3,668,425 | 6/1972 | Schmidt | 307/216 |
| 3,683,202 | 8/1972 | Schmidt | 307/216 |
| 3,686,644 | 8/1972 | Christensen | 307/216 X |

*Primary Examiner*—John S. Heyman
*Attorney*—Paul F. Wille

[57] ABSTRACT

A three transistor exclusive-OR logic circuit is disclosed in which only three of the four possible logic levels of the two input variables are needed.

2 Claims, 3 Drawing Figures

EXCLUSIVE-OR LOGIC CIRCUIT

This invention relates to logic circuits, and, in particular, to exclusive-OR logic circuits. This application is a division of Ser. No. 146,967, filed May 26, 1971, now U.S. Pat. No. 3,705,390.

As originally devised, a computer memory stored information on the basis of an address; i.e. the location of information in the memory was known, although the contents of the information was not. With this type of storage, processing is carried out sequentially, on a step-by-step basis.

As the required or desired speed of the computer was pushed higher, it was apparent that other means had to be devised for storing the information. This led, in the mid-1950's, to the idea of an associative memory array formed by adding an "exclusive-OR" function to each site in the storage array. This logic function enables the information to be searched for and found. In addition, exclusive-OR circuits are used alone or with other logic circuits outside the area of content addressed memories as the basic element of a logic family.

While the exclusive-OR logic function has been known per se for some time, it is a continuing desire to reduce the size, cost, and complexity of the implementations of this logic function as a semiconductor device.

In the prior art, the use of integrated circuits instead of discrete devices greatly reduced the size, etc. of these devices. However, there still exists the need to obtain more function from less circuitry.

In addition, due to the nature of the MOS devices utilized, voltage losses occur which slow down the logic circuits by lowering the voltage to which different points in the circuit can charge and decrease the amplitude of the output signal. Thus, there is also a need for voltage enhancement, particularly where the logic circuitry is cascaded.

In view of the foregoing, it is therefore an object of the present invention to provide a high density logic circuit.

Another object of the present invention is to provide an improved exclusive-OR circuit requiring less peripheral circuitry.

A further object of the present invention is to provide an improved exclusive-OR circuit in which voltage losses are reduced.

The foregoing objects are achieved in the present invention wherein there is provided a three transistor logic circuit in which the signals defining one variable are coupled to two MOS transistors having the sources thereof connected together. A single signal defining the other variable is coupled to the gate of one of said two transistors and the output is coupled to the gate of the other of the two transistors. The third transistor has the source and gate thereof connected together to form a diode, which is connected between the sources of said two transistors and said output.

Figure 1:
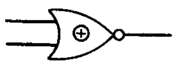

A more complete understanding of the present invention can be obtained by considering the following detailed description in conjunction with the accompanying drawings, in which:

FIG. 1 illustrates the electrical symbol for an exclusive-OR circuit.

FIG. **2*a*** illustrates the exclusive-OR logic circuit of the present invention.

FIG. **2*b*** illustrates the exclusive-OR logic circuit of the present invention in "bubble" symbolism.

Figure 2A:
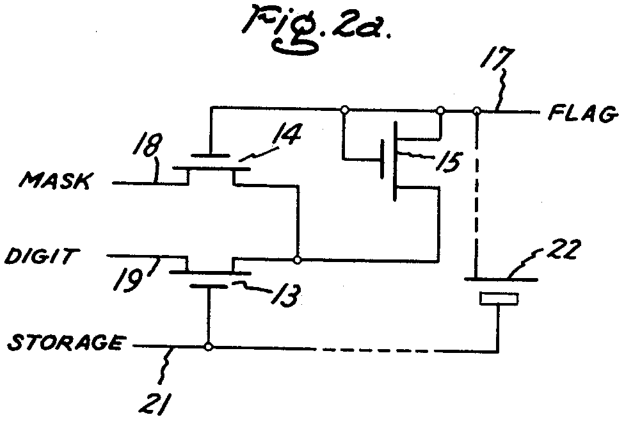
Figure 2B:
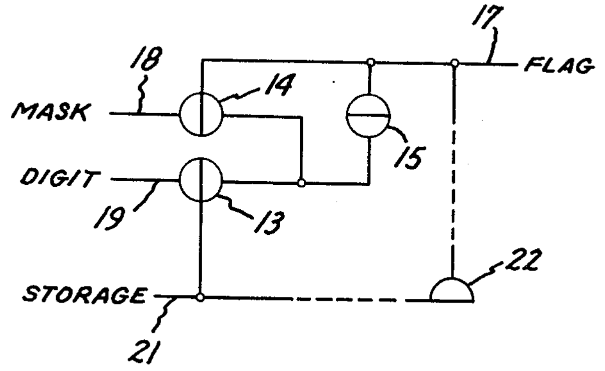

FIGS. **2*a* and 2*b* illustrate one embodiment of the present invention utilizing two different electronic symbols for the MOS devices utilized. FIG. 2*a* utilizes the more or less conventional symbol for an MOS field effect transistor. FIG. 2*b* utilizes a "bubble" symbolism that is receiving a widespread and increasing acceptance in the scientific community due to the ease with which digital and/or logic circuitry can be represented. FIGS. 2*a* and 2*b*** schematically illustrate the same electronic circuit.

FIG. 1 illustrates the predominant symbol utilized for an exclusive-OR circuit. As more fully explained below, the circuitry of the present invention is, more properly, an "identify" or "exclusive-OR complemented" circuit, which is the logic inverse of exclusive-OR. Thus, using standard notation, the exclusive-OR symbol (⊕) within the triangle must be read with the inversion symbol (*o*) on the output. Throughout this specification, the term "exclusive-OR" is used as the common term for this type of logic.

It should be noted that only two input lines are shown, as is the convention. It is known and understood that, while not shown schematically, the inverse of the input signals is necessary for the logic circuit to operate and this is generally provided, either internally or by suitable external apparatus in the actual circuit using the logic, as by an inverter or by address selection circuitry. The exclusive-OR function itself may be written as the following logic equation:

$$f = S \cdot \bar{D} + \bar{S} \cdot D = S + D$$

The above equation is read "an output is obtained if *S* exists and *D* does not or if *S* does not exist and *D* does." As previously noted, the logic utilized in the present invention is, strictly speaking, an "identity" logic function. The identity function is written as $f = S \cdot D + \bar{S} \cdot \bar{D}$, that is, S ≡ D, which is the logical inverse of "exclusive-OR."

It should be noted with respect to the exclusive-OR circuit of the present invention that the circuit is asymmetrical in that a signal representing a logic 0 or a logic 1 is applied to storage line 21 but that the complement is not also applied to the circuit. In logic circuits of the prior art, signals representing the desired logic information and the complement of the logic information must be used. This has been necessary to provide the four portions of the above-noted logic equations, namely S, $\bar{S}$, D and $\bar{D}$.

In the logic circuit of the present invention, the complement of the logic information on line 21 is not necessary although the circuit acts as though the complement were applied. Thus, the actual logic has only three inputs and further requires only three transistors to obtain the necessary exclusive-OR function.

Referring to FIGS. **2*a* and 2*b*, mask line 18 corresponds to the $\bar{D}$ input to the circuit, digit line 19 corresponds to the D input, and storage line 21** provides the S input.

The exclusive-OR logic circuit comprises three MOS transistors, 13–15, in which the sources of transistors 13 and 14 are connected together and are connected to the output, flag line 17, by transistor 15 connected as a diode. The gate of transistor 14 is also coupled to line 17. The gate of transistor 13 is coupled to one input, storage line 21. The drain of transistors 13 and 14 form the other two input lines, 19 and 18, respectively, to the logic circuit.

Voltage variable capacitor 22 may be fabricated simultaneously with the other elements of the logic circuit and comprises a drain formed in the substrate of semiconductive material utilized in making transistors 13–15. Slightly overlying the drain is an enlarged gate structure comprises an insulating layer having a metal layer thereover. The gate structure is connected to the gate of transistor 13, which forms input 21.

In operation, a voltage applied to line 21 that is sufficient to turn on transistor 13 also activates voltage variable capacitor 22, inducing an inversion layer underneath the gate structure in the semiconductor substrate. The inversion layer is coupled to the drain electrode and forms one electrode of the capacitor. The metal layer utilized in the gate structure forms the other electrode of the voltage variable capacitor.

The capacitance exhibited by voltage variable capacitor 22 is determined by the area of the gate electrode and the nature of the insulating layer. In the off condition the inversion layer is absent and the capacitance between the source and gate of voltage variable capacitor 22 is limited to the small region of overlap between the gate and the drain electrodes. A more detailed description of voltage variable capacitor 22 including several modifications of the basic structure is disclosed and claimed in copening application Ser. No. 146,966, filed May 26, 1971, and assigned to the same assignee of the present invention.

The following "truth table" represents the operation of the logic in response to various combinations of inputs:

| Digit (D) | Mask ($\overline{D}$) | Stored (S) | Flag |
|---|---|---|---|
| 1 | 0 | 1 | stays high |
| 0 | 1 | 1 | discharges |
| 1 | 0 | 0 | discharges |
| 0 | 1 | 0 | stays high |

The logic circuit operates by the comparison of the logic level of a signal stored or applied to the gate of transistor 13 with the logic level of signals applied to lines 18 and 19. When the logic function is satisfied, the flag line, which is initially precharged and allowed to float, is held high by being coupled to a source of potential.

Specifically, with a high level signal stored on or applied to gate 13, digit line 19 may be either high or low (and mask line 18 the complement). If digit line 19 is high, a current path exists through transistor 13 and transistor 15 to maintain flag line 17 high, indicating that the function is satisfied, as noted in the first line of the truth table.

With digit line 19 at ground potential, flag line 17 is discharged through transistors 13 and 15, as indicated in the second line of the truth table.

With line 21 at a low potential, transistor 13 is, in effect, out of the circuit and flag line 17 is either discharged or maintained at a high level depending upon whether input line 18 is low or high, respectively, of the truth table.

In actual practice, due to voltage drops within the logic circuit, line 17 may discharge slightly when the function is satisfied, but not sufficiently so as to cause an indication that the function is not satisfied when it actually is.

The additon of voltage variable capacitor 22 to the logic circuit enhances the voltages therein and reduces the operating time. For example, with a logic 1 (high) level signal on line 21, voltage variable capacitor 22 is in an active or high capacitance state. Capacitor 22 couples the voltage on flag line 17 to the gate of transistor 13, where it is additively combined with the voltage on the gate. This more fully turns on transistir 13, which either more fully discharges line 17 or maintains it at a higher potential.

With a logic 0 (low) level on line 21, voltage variable capacitor 22 is in a low capacitance state and effectively out of the circuit. The circuit then functions as described previously.

Thus, an exclusive-OR circuit is provided in which the logic determination between two variables is obtained with a minimum number of input lines and a minimum number of circuit components. In addition, higher output voltages are obtainable and the circuit is capable of high density fabrication.

In view of the foregoing, it will be apparent to those of skill in the art that various modifications can be made within the spirit and scope of the present invention. For example, while described in conformity with the above-identified parent application as an inverted output, exclusive-OR circuit, the signals on leads 18 and 19 can be reversed, rather than invert the output, to obtain the true exclusive-OR function; i.e. mask line 19 can be used as the (D) input to the circuit.

I claim:

1. An exclusive-OR circuit comprising:

first, second and third inputs;

an output;

a first metal-oxide-semiconductor field effect transistor having the drain and gate thereof connected together to said output to form a diode;

a second metal-oxide-semiconductor field effect transistor having the source-drain path thereof series connected with the source-drain path of said first transistor between said first input and said output, the gate of said second transistor being connected to said second input; and a third metal-oxide-semiconductor field effect transistor having the source-drain path thereof connected between said third input and the junction of the source-drain paths of said diode and said second transistor and the gate thereof connected to said output.

2. An exclusive-OR circuit as set forth in claim 1 and further comprising a voltage variable capacitor connected between said second input and said output.

* * * * *